(12) United States Patent
Burczyk et al.

(10) Patent No.: US 6,883,562 B2
(45) Date of Patent: Apr. 26, 2005

(54) DEVICE AND METHOD FOR FILLING OF HYDRAULIC PRESSURE MEASUREMENT MECHANISMS

(75) Inventors: Dietfried Burczyk, Teltow (DE); Wolfgang Dannhauer, Teltow (DE); Harri Notacker, Caputh (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/703,082

(22) Filed: Nov. 7, 2003

(65) Prior Publication Data

US 2004/0250869 A1 Dec. 16, 2004

(30) Foreign Application Priority Data

Nov. 7, 2002 (DE) .......................................... 102 52 247

(51) Int. Cl.[7] .................................................. B65B 1/04
(52) U.S. Cl. ............................. 141/65; 141/83; 141/67
(58) Field of Search ............................... 141/1, 65, 67, 141/59, 83, 286

(56) References Cited

U.S. PATENT DOCUMENTS

| 4,833,922 A | * | 5/1989 | Frick et al. ...................... 73/756 |
| 4,928,376 A | * | 5/1990 | Poglitsch ....................... 29/530 |
| 6,267,159 B1 | * | 7/2001 | Adolf et al. ................... 141/95 |

* cited by examiner

Primary Examiner—Steven O. Douglas
(74) Attorney, Agent, or Firm—Bacon & Thomas

(57) ABSTRACT

For avoiding the evaporation of volatile components of a fill oil and for avoiding contamination of the fill oil with ambient air, a method for the filling of hydraulic pressure measurement mechanisms by means of a readied filling chamber. The method includes the following steps: (I) Evacuating the filling chamber by means of a vacuum pump over a first path of a first conductivity, extending between the vacuum chamber and the vacuum pump; (II) ending the evacuation of the filling chamber over the first path; (III) continued evacuating of the filling chamber by means of the pump over a second path of a second conductivity, extending between the filling chamber and the vacuum pump, wherein the second conductivity is smaller than the first conductivity; (IV) feeding the fill oil into the evacuated fill chamber and (V) filling the measurement mechanisms.

8 Claims, 3 Drawing Sheets

DEVICE AND METHOD FOR FILLING OF HYDRAULIC PRESSURE MEASUREMENT MECHANISMS

FIELD OF THE INVENTION

The present invention relates to a device and a method for filling hydraulic pressure- and differential pressure-measurement mechanisms, or other hollow bodies to be filled that have very narrow cavities.

BACKGROUND OF THE INVENTION

The measurement mechanisms for absolute pressure, relative pressure and differential pressure using hydraulic pressure transfer exhibit very narrow canals, in order to minimize the required liquid volume. This necessitates, however, a filling of the measurement mechanisms under vacuum. For standard applications, silicone oils having a low vapor pressure are used for the filling, in order that the work can be done at high vacuum without difficulty.

Measurement mechanisms for pressure sensors intended for use in oxygen plants must only be filled with fill liquids which have been specially permitted, in Germany by the Bundesanstalt für Materialprüfung BAM (Federal Institute for Material Testing), and are included in a special list under Unfallverhütungsvorschrift "Sauerstoff" (Accident Prevention Directive "Oxygen") BVG B7 (VBG 62) of the Berufsgenossenschaft der chemischen Industrie (Professional Association of the Chemical Industry). Such permitted liquids are, for example, polychlorotrifluoroethylene, which is offered by various manufacturers under the tradenames or marks Halocarbon, Voltalef or Fluorolub. The $O_2$-oils usable in the required temperature range from $-20°$ C. encompass a mixture of molecules of different molecular lengths, with the partial pressure of the short-chained molecules lying in the region of $10^{-1}$ torr. If these fill oils are applied under usual vacuums, for instance $<10^{-2}$ torr, then the short-chained components evaporate, which leads to the result that the composition can change to such an extent that the fill oils no longer satisfy the specifications of the oxygen permit. Additionally, the viscosity increases, whereby, on the one hand, the fill behavior is degraded, and, on the other hand, the lower limit of the temperature use range is raised. Thus, the problem concerns not only the fill oils for use in oxygen plants but also, in a certain way, all fill oils which involve a mixture of molecules of different molecular weights.

The effect of the evaporation of lighter components is, for example, evident on the basis of a mass spectrum, such as shown, for example, in FIG. 2. The continuous line shows the mass spectrum of the original fill oil, while the dashed line shows the spectrum of the fill oil, after having been held under a pressure which was too low.

It is, therefore, necessary to set the pressure in the filling installation such that an excessive outgassing of the fill oils is avoided. Concerning this, it was previously usual to let the pump for evacuating the fill chamber continue running with full power and to set the pressure in the fill chamber using a defined leak, for instance by way of a needle valve. This technique is disadvantageous in that ambient air enters continuously into the fill chamber to contaminate the surfaces of the fill chamber and the fill liquid e.g. with moisture in the air. Through this, the properties of the liquid can be degraded.

SUMMARY OF THE INVENTION

It is, therefore, an object of the present invention to provide a method and a device which overcome these disadvantages.

This object is achieved by a method according to which the filling of hydraulic pressure measurement mechanisms by means of a filling chamber includes the following steps:

(I) Evacuating the filling chamber by means of a vacuum pump over a first path of a first conductivity, extending between the vacuum chamber and the vacuum pump;

(II) ending the evacuation of the filling chamber over the first path;

(III) continued evacuating of the filling chamber by means of the pump over a second path of a second conductivity, extending between the filling chamber and the vacuum pump, wherein the second conductivity is smaller than the first conductivity;

(IV) feeding the fill oil into the evacuated fill chamber and

Preferably, the second conductivity is at least smaller than the conductivity by a factor of 10, and especially preferably at least by a factor of 100.

The second path is preferably so dimensioned that an equilibrium pressure between about 0.5 torr and 1 torr is established in the fill chamber.

The first path is preferably so dimensioned that its conductivity is sufficient to evacuate the filling chamber in a relatively short time to the degree required for the filling of the measurement mechanism, for example a pressure of 0.5 torr. This is not, however, by far, the equilibrium pressure which would be achieved, if the filling chamber would continue to be evacuated over the first path.

The second path is preferably arranged in parallel with the first path. For this case, a shut-off valve is preferably arranged in the first path, by which the first path can be closed, when the required pressure has been achieved.

Alternatively to this, the second path can be arranged not in parallel with the first path, but, rather, be formed by a modification of the first path. For this purpose, an aperture, for example, can be brought into position in the first path.

The exact conductivity of the first path is not critical, to the extent that it needs only to be large enough to assure a sufficiently fast evacuation of the filling chamber. The critical parameter is the conductivity of the second path, since this is the path which determines the equilibrium pressure for given suction capacity of the vacuum pump and given "natural leaks" of the filling chamber. Under "natural leaks" are categorized all gas sources which are unavoidable without inordinate expense. Included are outgassing processes in the internal surfaces of the apparatus, as well as the incursion of gasses through small, unsealed locations at flanges and other components.

When the second path is formed by a cylindrical line of length L and radius R, which extends in parallel to the first path, then the second conductivity C is given using the aperture conductivity of the line and the internal conductivity of the line in the case of molecular flow, or flux, by the following equation $$C = v \cdot \frac{1}{4}\pi R^2 \cdot \frac{1}{1 + \frac{3}{8}\frac{L}{R}},$$

where v is the average velocity.

For the second path, L>>R. Consequently, the second conductivity C is, to a first approximation:

$$C \approx v \cdot \frac{2}{3}\pi \cdot \frac{R^3}{L}$$

Fine adjustment of the conductivity can, consequently, be done expediently by selection of the line length L for given diameter.

If the second path is formed by a modification of the first path, for example by inserting an aperture of opening area A into the second path, then the conductivity is, to a first approximation, proportional to A.

The described method is self-regulating, in so far as the effective suction capacity over the second path is decreased by the evaporation of small amounts of the transfer liquid, which causes the pressure in the filling chamber to rise again and a further evaporation is prevented.

The device of the invention for filling of measurement mechanisms with a transfer liquid includes a filling chamber; a vacuum pump; a first suction line of a first conductivity between the filling chamber and the vacuum pump; and a second suction line of a second conductivity between the filling chamber and the vacuum pump, wherein the first suction line is interruptible by means of a valve, wherein the second conductivity is smaller than the first conductivity.

Alternatively, the device of the invention for filling of measurement mechanisms with a transfer liquid includes a filling chamber; a vacuum pump; a suction line of a first conductivity between the filling chamber and the vacuum pump; and an aperture which can be brought into the suction line, wherein the effective conductivity is decreased by the aperture to a second conductivity, which is significantly smaller than the first conductivity.

Preferably, the second conductivity is at least an order of magnitude smaller than the first conductivity and preferably at least two orders of magnitude smaller.

The device of the invention preferably includes a measurement device for determining the pressure in the filling chamber, wherein optionally a control can be provided, which automatically closes the valve or automatically brings an aperture in, when, following the evacuation of the filling chamber, a limit value, for example the desired equilibrium pressure, has been achieved. In the same way, the ending of the evacuation over the first path can proceed upon the expiration of an experimentally determined time sufficiently long to achieve the equilibrium pressure. For ending the evacuation over the first path, a time switch can optionally be provided for this case.

Of course, the device includes the usual lines and connections for the filling of the measurement mechanisms with transfer liquid. These means, however, are familiar to those skilled in the are and do not need to be discussed here in detail.

The filling chamber can either be constructed such that the measurement mechanisms are completely surrounded by the filling chamber, or the filling chamber can have connections, to which the measurement mechanisms are attached by their fill openings using pressure tight connections.

The measurement mechanisms of the invention distinguish themselves in that they were filled with fill liquid according to the described method. I.e., the liquid is free of contamination and the more volatile constituents are still present in full force.

DESCRIPTION OF THE PREFERRED EMBODIMENT

Figure 1:
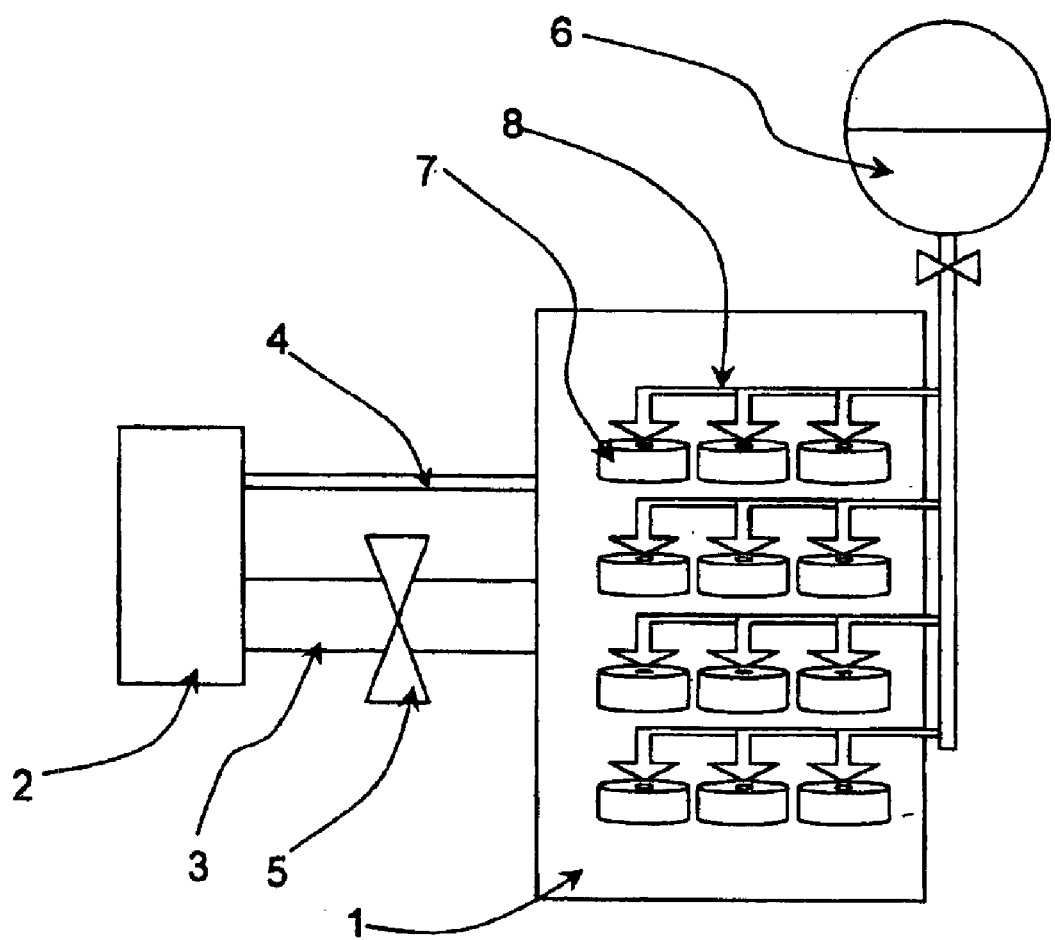
FIG. 1: is a schematic diagram of a first embodiment of a device of the invention.
Figure 2:
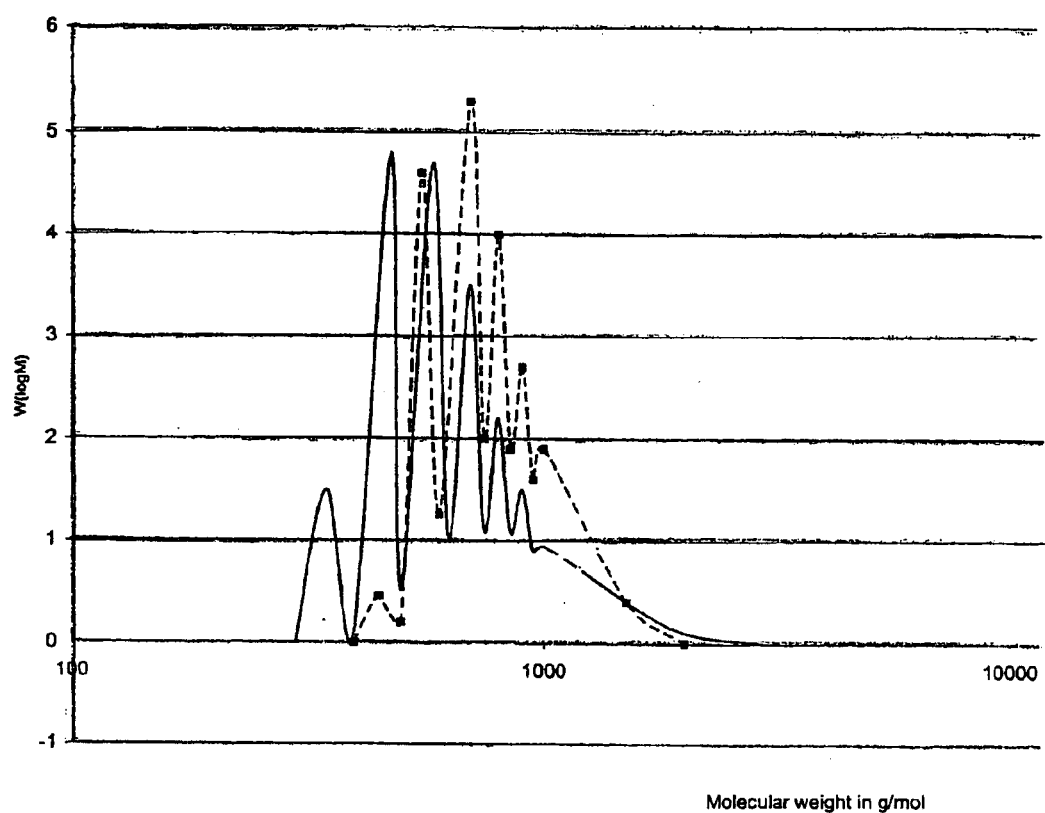
FIG. 2: shows a mass spectra of a fill liquid before and after the evaporation of light components.

The device of the invention shown in FIG. 1 includes a filling chamber, or receptacle, 1 to receive the sensors 7 to be filled. The receptacle has a volume of about 10 l and is connected over a line 3 of about 7 cm diameter and about 1 m length with a vacuum pump 2, which preferably is a rotary vane pump. The line 3 is closable by means of a valve 5. In parallel with line 3, a line 4 of about equal length, with a diameter of about 2 mm, extends between the receptacle, or filling chamber 1 and the vacuum pump 2. The receptacle 1 is connected with an oil container 6, by way of suitable taps 8. The oil container is, preferably in a similar manner, kept permanently under vacuum, with the pressure in the oil container preferably being about the equilibrium pressure in the receptacle.

Following the charging of the receptacle with the measurement mechanisms of the pressure sensors 7, the receptacle is closed and first evacuated through the first suction line 3. Upon reaching the required pressure, which is about the equilibrium pressure during pumping over the second path, the first suction line 3 is closed by means of the valve 5 and further pumping out of the receptacle proceeds over the second suction line 4, which presents a considerably smaller conductivity, so that an equilibrium pressure sets in, which is determined by the pumping speed of the vacuum pump 2, the conductivity of the second suction line 4 and the properties of the receptacle. After reaching the equilibrium pressure, the fill oil for filling the measurement mechanisms 7 through the taps 8 is introduced into the receptacle, in order to fill the measurement mechanisms. For this, the fill oil can, for example, drop through corresponding nozzles through suitable openings into the measurement mechanisms. Alternatively, the fill openings of the measurement mechanisms can be immersed downwards into a fill oil bath in the receptacle, in which case the filling then proceeds by way of the ventilation of the receptacle.

Figure 3:
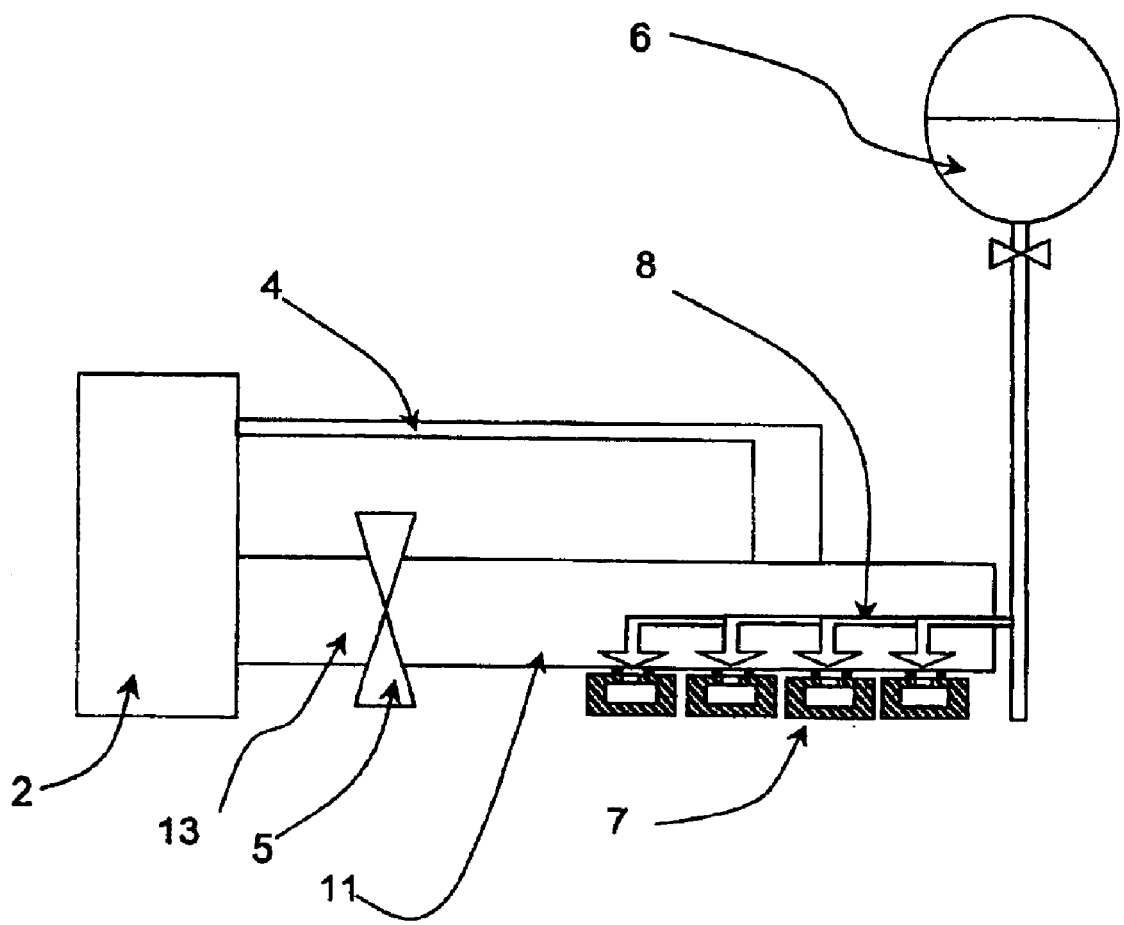
FIG. 3: is a schematic diagram of a second embodiment of a device of the invention.

FIG. 3 shows a second embodiment of the device of the invention, wherein, in this case, the fill chamber 11 is formed by a cylindrical tube with a diameter of about 8 cm and has connections on its underside for the measurement mechanisms 7. The measurement mechanisms can have pressure tight attachments with the connections, with the fill openings of the measurement mechanisms being aligned with the connections. Aligned with each connection is a filling nozzle of the fill tap 8.

The cylindrical tube is connected directly with a pump 2. Consequently, the first path 13 is essentially the fill chamber 11 itself. A valve 5 is provided to interrupt the first path. The second path is formed by a suction line 4 having a diameter of about 2 mm. Line 4 branches from the cylindrical 2 and is connected with the pump 2.

What is claimed is:

1. A method for the filling of hydraulic pressure measurement mechanisms by means of a filling chamber, comprising the steps of:

Evacuating the filling chamber by means of a vacuum pump over a first path of first conductivity, the first path extending between the vacuum chamber and the vacuum pump;

ending the evacuation of the filling chamber over the first path;

continued evacuating of the filling chamber by means of the pump over a second path of second conductivity, the second path extending between the filling chamber and the vacuum pump, wherein the second conductivity is smaller than the first conductivity;

feeding the fill oil into the evacuated fill chamber; and filling the measurement mechanisms.

2. The method as claimed in claim 1, wherein the second conductivity is at least smaller than the first conductivity by a factor of 10, and, preferably, at least by a factor of 100.

3. The method as claimed in claim 1, wherein the second conductivity is preferably so sized that an equilibrium pressure between about 0.5 torr and 1 torr is established in the fill chamber.

4. The method as claimed in claim 1, wherein said ending of the evacuation of the filling chamber over the first path proceeds after the fill chamber is evacuated to a pressure corresponding to the equilibrium pressure that establishes itself upon continued evacuation over the second path.

5. A filling device for the filling of hydraulic measurement mechanisms of pressure sensors with a fill oil, comprising:

a filling chamber;

a vacuum pump;

a first path connected to said filling chamber and said vacuum pump, said first path having a first conductivity for evacuating the fill chamber with said vacuum pump;

a second path connected to said filling chamber and said vacuum pump, said second path having a second conductivity for evacuating the fill chamber with said vacuum pump; wherein said second conductivity is smaller than said first conductivity; and blocking means for closing said first path.

6. The device as claimed in claim 5, wherein said blocking means includes a valve.

7. The device as claimed in claim 5, wherein said blocking means includes an aperture.

8. A measurement mechanism for a hydraulic pressure sensor, which is filled with a fill oil, wherein the filling with fill oil is accomplished by the method defined in claim 1.

* * * * *